(12) United States Patent
Vauthier

(10) Patent No.: US 6,168,373 B1
(45) Date of Patent: Jan. 2, 2001

(54) DUAL HYDROTURBINE UNIT

(76) Inventor: Philippe Vauthier, P.O. Box 3124, Annapolis, MD (US) 21403

(*) Notice: Under 35 U.S.C. 154(b), the term of this patent shall be extended for 0 days.

(21) Appl. No.: 09/287,856

(22) Filed: Apr. 7, 1999

(51) Int. Cl.[7] ........................................... F01D 25/28
(52) U.S. Cl. .................. 415/7; 415/60; 415/221; 415/906; 415/908; 416/86; 416/189; 416/DIG. 4
(58) Field of Search ................... 415/3.1, 4.3, 4.5, 415/7, 60, 200, 221, 208.2, 211.1, 906, 908; 416/85, 86, 93 A, 93 R, 189, 192, DIG. 4

(56) References Cited

U.S. PATENT DOCUMENTS

| | | | |
|---|---|---|---|
| 2,501,696 | * | 3/1950 | Souczek .................................. 416/85 |
| 3,986,787 | * | 10/1976 | Mouton, Jr. et al. ..................... 415/7 |
| 4,258,271 | * | 3/1981 | Chappell et al. ....................... 290/54 |
| 4,274,009 | * | 6/1981 | Parker, Sr. ............................. 290/43 |
| 4,285,481 | * | 8/1981 | Biscomb ................................. 244/33 |
| 4,511,808 | | 4/1985 | Jost . |
| 4,519,742 | | 5/1985 | Van Buytene . |
| 4,598,210 | | 7/1986 | Biscomb . |
| 4,722,665 | | 2/1988 | Tyson . |
| 4,843,249 | | 6/1989 | Bussiere . |
| 4,849,647 | | 7/1989 | McKenzie . |
| 5,040,948 | | 8/1991 | Harburg . |
| 5,324,988 | | 6/1994 | Newman . |
| 5,471,098 | | 11/1995 | Asay . |

OTHER PUBLICATIONS

U.S. Department of Energy, Idaho Field Office DOE Hydropower Program Engineering Research and Development Summary Report, DOE/ID–10376, 1977–1991.

* cited by examiner

Primary Examiner—Edward K. Look
Assistant Examiner—Ninh Nguyen
(74) Attorney, Agent, or Firm—Troutman Sanders LLP; Wm. Brook Lafferty

(57) ABSTRACT

An environmentally non-intrusive multiple turbine unit for adjustable deployment in water. The turbines are captured in a shroud having an integrally formed augmentor ring and ballasting member to improve efficiency. The multiple turbine arrangement effectively counteracts the rotational counter-torque of individual turbines, thereby enabling stable deployment of the unit without requiring rigid stabilizing structures.

19 Claims, 4 Drawing Sheets

DUAL HYDROTURBINE UNIT

BACKGROUND

For generations, man has sought ways to harness natural kinetic resources to meet ever increasing electrical power generation needs. Notably, the implementation of large scale hydroelectric facilities has been amply demonstrated to be a successful method of electrical power generation.

The success of large scale hydroelectric generation notwithstanding, such massive facilities have numerous drawbacks. Specifically, these projects require construction on a colossal scale, which construction inevitably modifies or damages surrounding environs and delicately balanced ecosystems. Such projects are also extremely expensive and, while economically feasible over the long term in industrialized nations, this type of project is simply too expensive for regions with limited financial resources.

To avoid these environmental and economic conflicts, the last twenty years have seen continuous yet frustrated development of more economical and less environmentally intrusive systems for hydroelectric power generation. In particular, vast scientific and financial resources have been expended in pursuit of hydrokinetic turbines which can convert kinetic energy within a normal flow of a body of water into a useful amount of electrical energy. Such power generation systems are obviously less environmentally intrusive than their conventional counterparts because they require little or no construction. Additionally, such systems are considerably less expensive than their large-scale counterparts, both in terms of purchase of equipment and deployment. However, for a wide variety of reasons, hydrokinetic turbines deployed in the normal flow of a body of water have heretofor not been successfully developed to the point where they could deliver adequate amounts of electric power at a reasonable "per kilowatt hour" cost, with an acceptable level of reliability.

During the period between 1977 and 1991, the United States Department of Energy ("DOE"), undertook a large scale hydropower program in which a multitude of entities with new ideas for advancing the technology of hydroelectric power generation were funded for development and testing of their concepts. A thorough summary of this program is contained in the "DOE Hydropower Program Engineering Research and Development 1977–1991 Summary Report", available through the DOE under document no. DOE/ID-13076, the contents of which report are specifically incorporated herein by reference. Despite the thirty four different projects undertaken during this fifteen year period at a cost of more than 5 million dollars, the project failed to yield any "small hydropower" systems which were commercially viable.

Of these thirty four projects undertaken in the DOE study, one is of particular interest—the initial development of a "free stream turbine" by Dr. Peter Lissaman. Dr. Lissaman's work was prophetic in that it provided a hint as to the energy generation potential of hydrokinetic turbines placed in a naturally occurring flow of water. Unfortunately, the project ultimately failed to yield a commercially viable and technologically sound hydrokinetic turbine system because of intolerable "technical risks". More specifically, these "technical risks" comprised three primary issues: deployment issues, cost efficiency issues and capacity issues.

History indicates that successful deployment of a hydrokinetic turbine is inherently problematic. First, rotation of a turbine about an axis in one direction generates an equal yet opposing counter-torque in the opposite direction. To counteract this counter-torque and maintain stability of the hydroturbine, a mounting apparatus such as a series of anchored support posts or columns are attached to the hydroturbine and then anchored to a stationary structure, such as the floor of a river, a bridge or some other immovable object. While this solution of the counter-torque problem stabilizes the hydroturbine, it prevents ease of adjustment of the location of the turbine to a different point within the moving body of water where the water current flow is optimum. As the characteristics of the flowing body of water change due to an increased volume of water, freezing, etc., the point of optimum flow also changes. The lack of mobility of a deployed hydroturbine limits the adaptability of the turbine to such differing conditions and creates a corresponding decrease in the efficiency of the machine.

The second of the "technical risks" relates generally to cost efficiency. Conventional turbines, and specifically hydroturbines, have historically been constructed of steel or lightweight metal such as marine aluminum for a variety of reasons. First, conventional wisdom dictates that a machine such as a hydroturbine fabricated of metal will be more durable in harsh surroundings than any alternative available material. Second, a fairly heavily weighted turbine housing, in conjunction with conventional anchoring mechanisms described above, provided the configuration best able to withstand and minimize the effects of counter-torque generated by rotation of the turbine blades and shaft.

While each of these suppositions regarding metal fabrication has merit, constructing a hydroturbine of even the lightest available metals still yielded a very heavy piece of equipment. Additionally, the cost of manufacturing a metal hydroturbine (in particular the metal shroud surrounding the machine) was very expensive. In fact, the Lissaman study concluded that although a smaller, shrouded hydroturbine could produce as much electrical output as a much larger unshrouded unit, the unshrouded unit of a much larger size was still less expensive to manufacture.

Additionally, the increased weight of the metal shrouded turbine created difficulty in deploying and retrieving the units. In many cases, heavy-duty transport helicopters or ships of substantial size and berth were required to deploy and retrieve metal hydroturbines. Because of the costs and other logistical issues associated with such support vehicles, use of such heavy hydrokinetic turbines in remote, undeveloped or disaster relief areas is not practical because of the inaccessibility of heavy duty deployment equipment. Ironically, it is those types of areas which have the greatest need for successful implementation of this technology.

Ultimately, the cost of manufacture of metal hydroturbines and the difficulties in deployment and retrieval of metal hydroturbines in view the relatively modest output of single metal hydroturbines has collectively prevented the successful implementation of such devices since the completion of Lissaman's project seventeen years ago.

Accordingly, there exists a need for a hydroturbine unit which overcomes the storied problems with hydrokinetic technology. More specifically, there exists a need for a hydroturbine unit which does not require substantial vehicular support for deployment or retrieval. There is an additional need for a hydroturbine unit which can be stabilized in a path of water flow without complex anchoring mechanisms. There is a further need for a hydroturbine unit which can be placed in a particular optimal position in a path of water flow, then easily maneuvered to a different position within the body of water in the event of a change of location of the optimal path of water flow. Finally, there is a need for a hydroturbine unit complying with the above-stated needs which is also economical to build and operate.

SUMMARY OF THE INVENTION

The following invention is a dual turbine unit which may be adjustably and easily deployed into and retrieved from a path of water flow. The preferred embodiment of the present invention comprises two hydroturbines in a "side-by-side" configuration, though it is specifically contemplated that three, four or more hydroturbines may be combined in an alternate embodiment which also falls within the spirit and scope of the invention. Referring back to the preferred embodiment in which two hydroturbines are implemented, each of the two hydroturbines has a turbine runner assembly including more than one turbine blades attached to a turbine hub which is, in turn, connected to a turbine shaft. Optimally, each turbine shaft is in general axial alignment with the path of water flow and the turbine blades extend radially outwardly from the axial alignment of the turbine shaft. Each turbine shaft is then connected to a turbine generator for converting the rotational force of the shaft into useful electrical energy. In a preferred embodiment of the present invention, the turbine generator is actually a series of "modular" generators, each of the modular generators being connected in series to modify the capacity and resulting yield of the hydroturbine to better accommodate changing conditions or locations without necessitating the purchase of an entirely new unit.

The hydroturbines in the dual turbine unit are maintained in their side-by-side configuration by mounting in a lightweight dual turbine shroud ("shroud"). The shroud is primarily constructed of at least one material from the group of composite materials including thermoplastics and fiberglass, and has a front edge facing the oncoming water flow and a rear edge proximate to a point of water discharge from the dual turbine unit.

The preferred embodiment also incorporates an augmentor ring proximate to and integral with the rear edge of the shroud. The augmentor ring extends generally radially outwardly with respect to the axial alignment of the turbine shafts and deflects the flow of water about the shroud so as to create a low pressure zone at the rear of the shroud, thereby "pulling" water through the turbine blades at velocity greater than that of the normal or surrounding flow of water.

A hollow tubular ballasting member is integrally formed with the shroud and disposed in substantially parallel alignment with the axial alignment of the turbine shafts. The ballasting member is preferably sealed in a watertight fashion by an endcap on either end of a ballast tube. Within the ballast tube, a reversible polarity actuator is fixedly attached and is functional to rotate a ballast weight shaft or lead screw engaged with a ballast weight. Rotation of the ballast weight shaft in one direction moves the ballast weight within the ballast tube toward one end of the ballast tube, and rotation of the shaft in the other direction moves the ballast weight in the opposite direction. Movement of the ballast weight changes the center of gravity of the dual turbine unit, thereby changing the attitude of the dual turbine unit.

Accordingly, it is an object of the present invention to provide a hydroturbine which does not require substantial vehicular support for deployment or retrieval. It is another object of the present invention to provide a hydroturbine unit which can be stabilized in a path of water flow without complex anchoring mechanisms. It is yet another object of the present invention to provide a hydroturbine unit which can be placed in a particular optimal position in a path of water flow, then easily maneuvered to a different position within the body of water in the event of a change of location of the optimal path of water flow. It is a further object of the present invention to provide a hydroturbine unit complying with the abovestated objects which is also economical to build and operate.

DETAILED DESCRIPTION

Figure 1A:
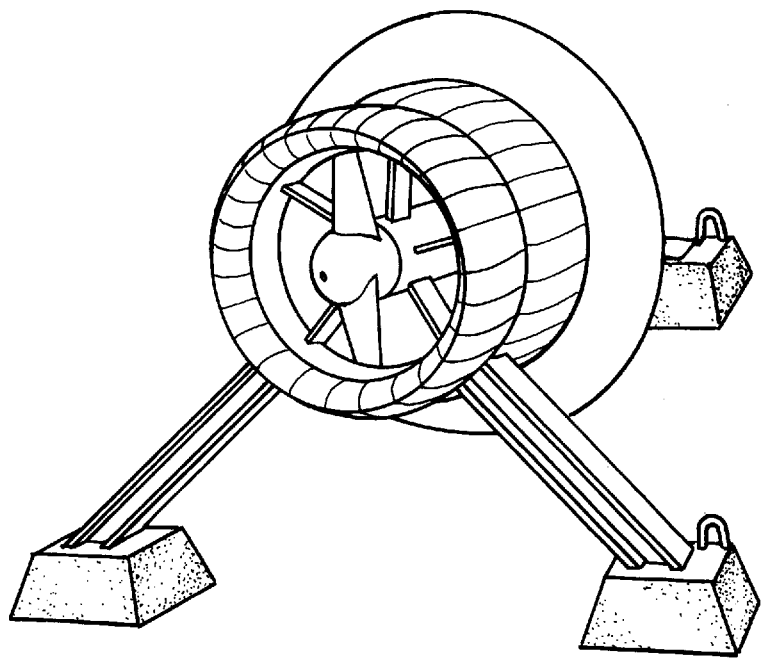
FIG. 1a depicts a PRIOR ART shrouded hydroturbine.
Figure 1B:
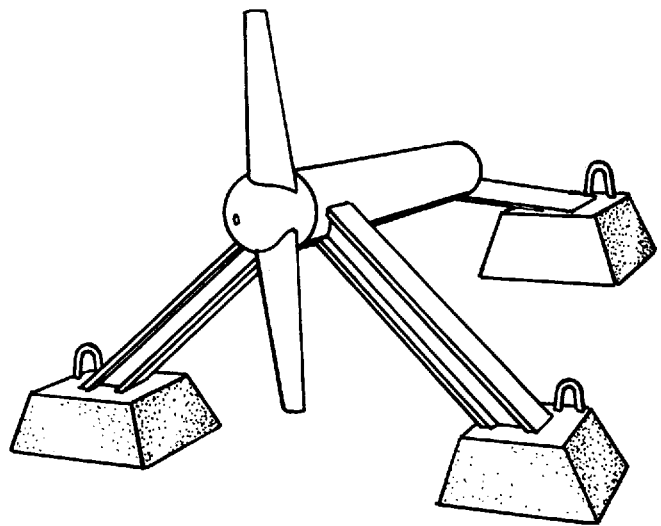
FIG. 1b depicts a PRIOR ART unshrouded hydroturbine.

Referring now to the drawings, FIG. 1a depicts a prior art shrouded hydroturbine rigidly attached to a stationary support structure. The hydroturbine depicted in FIG. 1b is another example of a prior art hydroturbine, similarly positioned in a flow of water by a stationary support structure, but without external shrouding.

Figure 2:
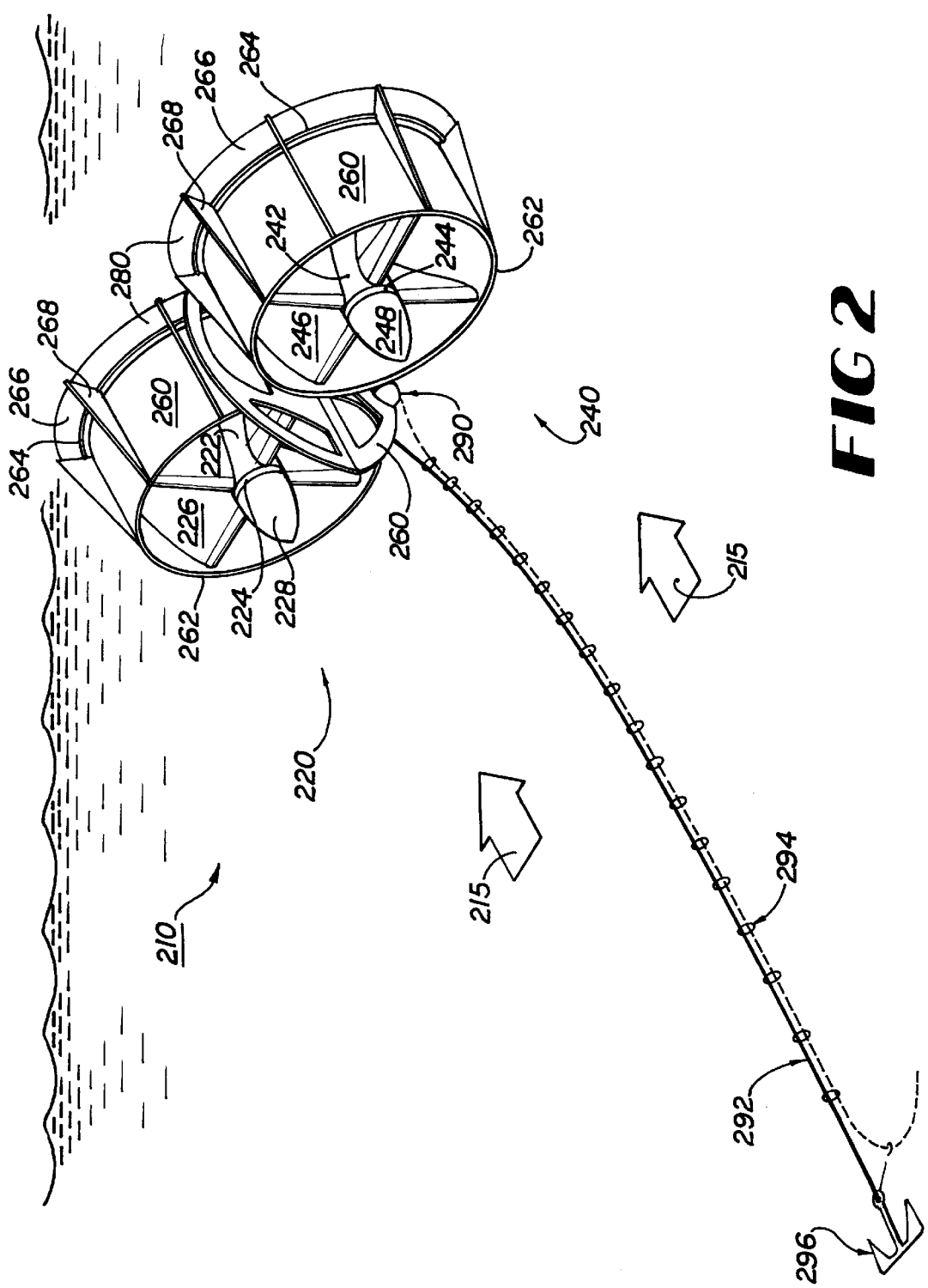
FIG. 2 is an illustration of an exemplary embodiment of the present invention in a typical operating environment.

Turning now to the present invention, FIG. 2 illustrates a preferred embodiment of the present invention in an exemplary environment for operation. Specifically, FIG. 2 shows a dual turbine unit 210 deployed in a path of water flow 215. For optimal performance, the dual turbine unit 210 is fully submerged in the path of water flow, though it is contemplated that the dual turbine unit 210 could be operated, albeit less efficiently, in a partially submerged condition. The dual turbine unit 210 comprises a first turbine 220 and a second turbine 240, both captured in a lightweight dual turbine shroud 260.

The first turbine 220 comprises a first turbine runner assembly 222. The first turbine runner assembly 222 incorporates a first turbine hub 224 fixedly but removably connected to a first turbine shaft (not shown in FIG. 1). The first turbine hub 224 also incorporates more than one first turbine blade 226, the first turbine blades 226 being positioned relative to the path of water flow 215 so as to force rotation of the first turbine hub 224, the first turbine runner assembly 222 and the first turbine shaft as water contacts the first turbine blades 226. Optionally, a first turbine hub cap 228 may be affixed to the first turbine hub 224 to increase hydrodynamic efficiency of the first turbine 220. As will be later depicted and as is well known in the art, the first turbine shaft is connected to a first turbine generator (not shown in FIG. 1) so that rotation of the first turbine shaft generates an electrical output from the first turbine generator.

In a preferred embodiment, first turbine 220 components including the first turbine runner assembly 222, first turbine hub 224, first turbine blades 226 and first turbine hub cap 228 may be fabricated of thermoplastic, fiberglass, a combination thereof, or any other similar material or combination of materials having characteristics including light weight, corrosion resistance and impact resistance.

The dual turbine unit 210 also includes a second turbine 240, which may be nearly identical to the first turbine 220. Specifically, the second turbine 240 comprises a second runner assembly 244. The second runner assembly 244 incorporates a second turbine hub 242 fixedly but removably connected to a second turbine shaft (not shown in FIG. 1). The second turbine hub 242 also incorporates more than one second turbine blade 246, the second turbine blades 246 being positioned relative to the path of water flow 215 so as to force rotation of the second turbine hub 242, the second turbine runner assembly 244 and the second turbine shaft as water contacts the second turbine blades 246. Optionally, a second turbine hub cap 248 may be affixed to the second turbine hub 242 to increase hydrodynamic efficiency of the second turbine 240. As will be later depicted and as is well known in the art, the second turbine shaft is connected to a second turbine generator (not shown in FIG. 1) so that rotation of the second turbine shaft generates an electrical output from the second turbine generator.

Both the first turbine 220 and second turbine 240 are captured within a dual turbine shroud ("shroud") 260. The shroud 260 comprises, generally, two integrally formed or otherwise permanently attached side-by-side cylindrical members. Each cylindrical member is disposed along a central axis concomitant with the respective axes of the respective first and second turbine shafts. The shroud 260 has a front edge 262 defining in part the radial edge of each respective cylindrical member facing the path of water flow 215. The shroud also has, at an opposing end of the joined cylindrical members, a rear edge 264.

The functionality of the dual turbine unit 210 is enhanced greatly by the positioning of an augmentor ring 266 proximate to the rear edge 264 of the shroud 260. The augmentor ring 266 extends generally radially outwardly from the rear edge 264 of the shroud 260 with respect to the axial alignment of the respective first and second turbine shafts. As water in the path of water flow 215 flows across the periphery of the shroud 260, it is deflected around the augmentor ring 266 by the protrusion of the augmentor ring 266 before resuming its previous path of water flow 215. This deflection of water proximate to the rear edge 264 of the shroud 260 creates a vacuum or venturi-type effect immediately downstream from the augmentor ring 266, thereby "pulling" water from the path of water flow 215 through the turbines within the shroud 260 at an accelerated speed, as compared to the normal speed of the water in the path of water flow 215. It follows logically that the accelerated water will turn the turbine blades 226, 246 faster, thereby generating greater electrical output from the generators.

Optionally, stabilizer fins 268 may be positioned about the periphery of the shroud 260 in a parallel arrangement with the axial alignment of the respective turbine shaft. In addition to the stabilizer fins 268 stabilizing the dual turbine unit 210 in the path of water flow 215, the stabilizer fins 268 have the added functionality of bolstering the strength of the shroud 260 and supporting the augmentor ring 266.

Still referring to FIG. 2, a ballasting member 290 is integrally formed or, in an alternate embodiment, fixedly attached to the shroud 260. In an exemplary embodiment, the ballasting member 290 is positioned between the cylindrical members of the dual turbine unit 210. Alternate embodiments may find the ballasting member 290 positioned at various locations on the dual turbine unit 210, though it is generally desirable for the ballasting member to be positioned as close to the center of gravity of the dual turbine unit 210 as possible, for balance. As will be described with reference to later figures, the ballasting member 290 is functional to change the attitude of the dual turbine unit 210 with respect to the path of water flow 215 by moving a weight fore and aft within the ballasting member 290 responsive to external control.

The dual turbine unit 210 may be maintained in the path of water flow by a tether 292. In the depicted embodiment, the tether 292 is connected at a first end to the dual turbine unit 210 and at a second end to an anchor 296.

Power derived from the dual turbine unit 210 may be routed from the first and second turbine generators via electrical cable 294. In the depicted embodiment, the electrical cable 294 may be maintained in tandem with the tether 292. Other embodiments are contemplated, however, wherein the electrical cable 294 is positioned and maintained separate and apart from the tether 292.

Figure 3:
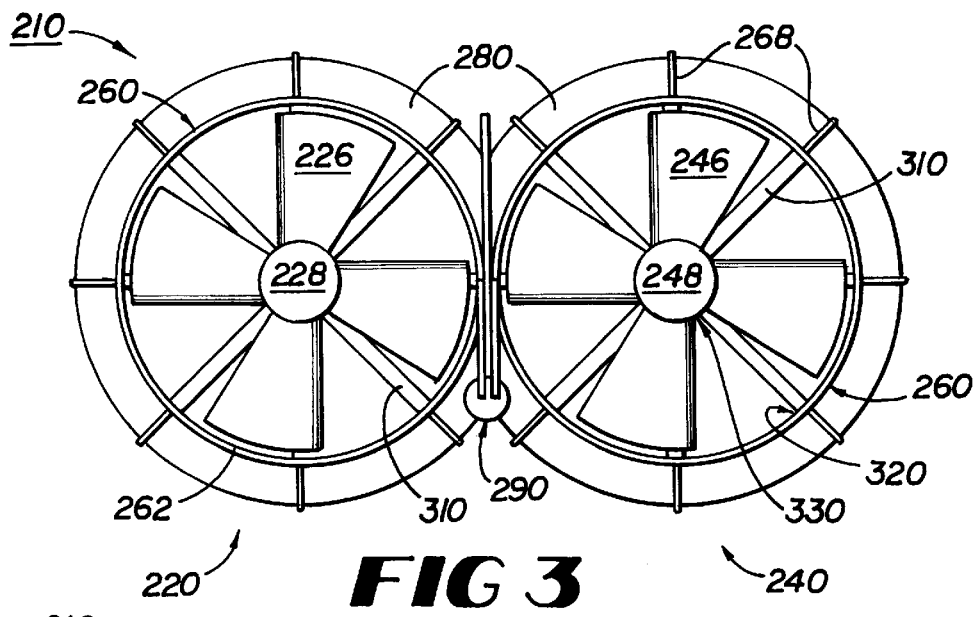
FIG. 3 is a FRONT VIEW of an exemplary embodiment of the present invention.

Turning now to FIG. 3, a front view of an exemplary embodiment of the present invention is shown. More specifically, FIG. 3 illustrates a dual turbine unit 210 having a first turbine 220 and a second turbine 240 fixedly positioned in a side-by-side arrangement. The first turbine 220 and second turbine 240 are captured, generally, in the shroud 260, the shroud 260 having a front edge 262, stabilizer fins 268 about the respective peripheries of the respective first turbine 220 and second turbine 240, and augmentor rings 280 extending generally radially outwardly from the direction of axially alignment of the respective turbine shafts (not shown) from a point beginning at or near the rear edge (not shown) of the shroud 260. The respective first and second turbines, 220 and 240, are captured within the shroud 260 by a plurality of struts 310. The struts 310 each have a first strut end 320 and a second strut end 330. The first strut end 320 of each strut 310 is fixedly attached to an inner wall of the shroud 260. The second strut end 330 of each strut 310 is fixedly attached to a respective first or second turbine generator housing (not shown). This static attachment between the shroud 260 and the turbine generator housings maintains the respective first and second turbines (220 and 240) in a position central to the shroud 260.

The front view of the exemplary embodiment of the present invention depicted in FIG. 3 also reveals a plurality of first turbine blades 226 extending generally radially outwardly from a first turbine shaft (not shown), and a first turbine hubcap 228. Similarly, a plurality of second turbine blades 246 are shown extending generally radially outwardly from a second turbine shaft (not shown) and a second turbine hub cap 248.

FIG. 3 also depicts a preferred position of a ballasting member 290 with respect to the first turbine 220 and second turbine 240. Although this is the preferred location of the ballasting member 290 in the preferred embodiment of the present invention, it will be understood and appreciated that the ballasting member 290 may be positioned anywhere on the dual turbine unit 210, so long as it is capable of achieving the desired and previously described functionality.

Figure 4:
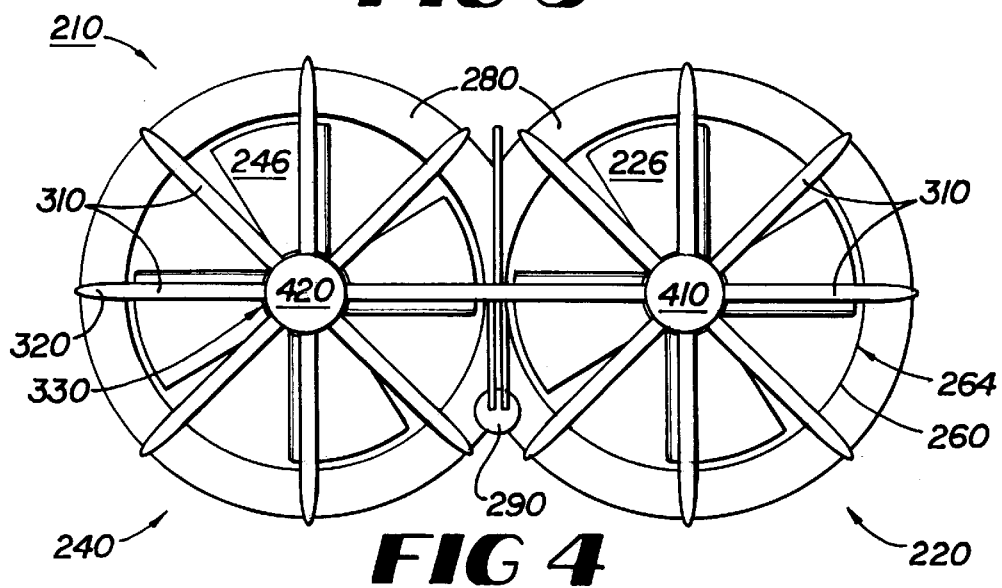
FIG. 4 is a REAR VIEW of an exemplary embodiment of the present invention.

FIG. 4 is a rear view of an exemplary embodiment of the present invention. Specifically, dual turbine unit 210 comprises a first turbine 220 and a second turbine 240. The shroud 260 captures each respective turbine by implementation of a plurality of struts 310. Each strut 310 is fixedly connected to the shroud 260 at a first strut end 320. The strut 310 is then connected to a respective first turbine generator housing 410 or second turbine generator housing 420 at a second strut end 330.

The augmentor ring 280 is attached to the shroud 260 at a point approximate to the rear edge 264 of the shroud 260. As previously described, the augmentor ring 280 extends generally radially outwardly from the respective shafts of the respective first and second turbines, 220 and 240.

Figure 5:
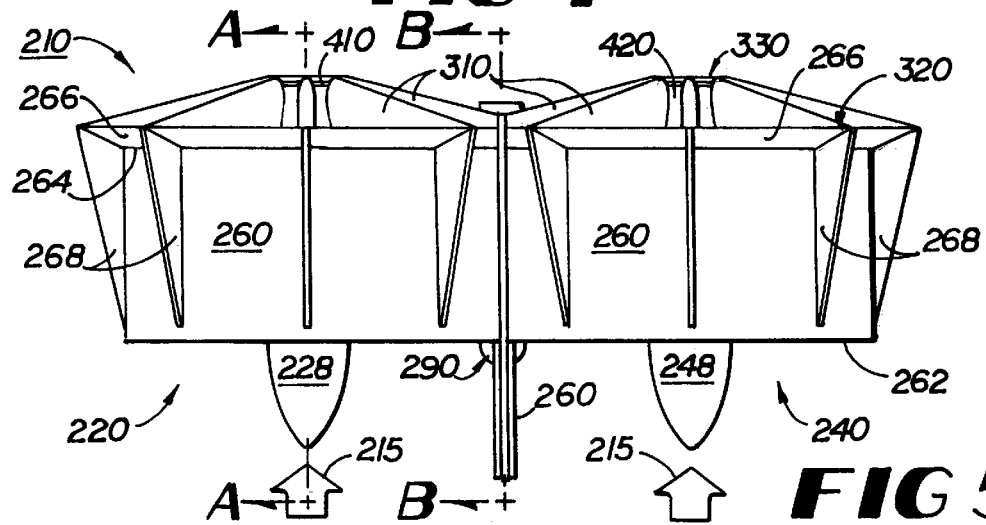
FIG. 5 is a TOP VIEW of an exemplary embodiment of the present invention.

Referring now to FIG. 5, a top view of an exemplary embodiment of the present invention is shown. As previously shown and described, first turbine 220 and second turbine 240 are captured within the shroud 260, the shroud 260 having a front edge 262 and a rear edge 264. Stabilizer fins 268 are positioned about the periphery of the respective first turbine 220 and second turbine 240 along the outside of the shroud 260 and in general axial alignment with the respective first and second turbine shafts (not shown).

Struts 310, each having a first strut end 320 and a second strut end 330 are positioned at the rear of the respective turbines 220, 240 and fixedly attached to the respective first and second turbine generator housings 410, 420 and to the shroud 260.

As can be seen in FIG. 5, the first turbine hub cap 228 and the second turbine hub cap 248 are positioned approximate to the front edge 262 of the shroud 260 and are hydrodynamically shaped to facilitate flow of water from the path of water flow 215 through the dual turbine unit 210.

FIG. 5 also illustrates section lines A—A and B—B, which corresponding cross-sectional views will be later described with reference to later figures.

Figure 6:
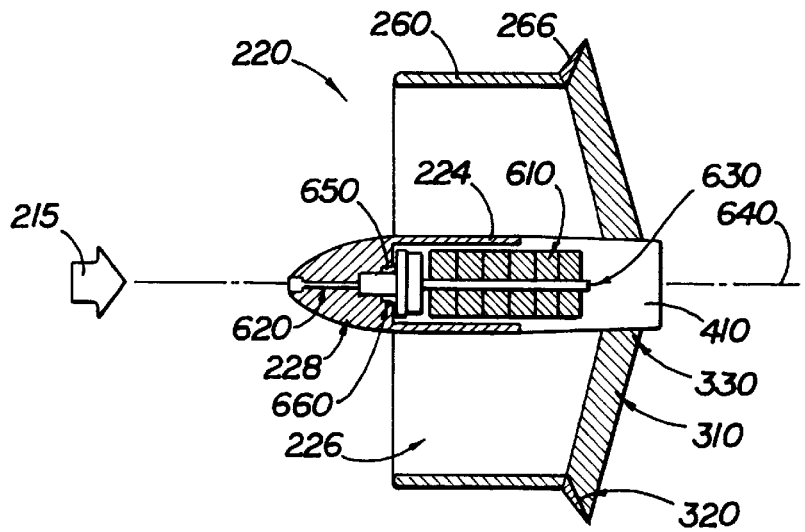
FIG. 6 is a CROSS SECTIONAL view of the exemplary embodiment of the present invention depicted in FIG. 5, taken along section lines A—A.

FIG. 6 is a cross-sectional of first turbine 220 taken along sectional lines A—A. FIG. 6 provides a view of the basic inner workings of the first turbine 220. Specifically, first turbine 220 is captured within the shroud 260 by a plurality of struts 310. Each strut, as previously described, has a first end attached to the shroud 260 and a second end fixed to the respective generator housing, in this case the first turbine generator housing 410. It should be noted that first strut ends 320 may be attached to either the main body of the shroud 260, or in the depicted embodiment, the augmentor ring 266. Without regard to the actual location of attachment of the first strut end 320, any attachment point would be within the spirit and scope of the invention, so long as the attachment is suitable to stabilize the respective turbine within the shroud 260. The first turbine 220 comprises, generally, a hub 224 to which a plurality of turbine blades 226 are attached. The hub 224 includes a first turbine hub cap 228, attached to the first turbine hub 224 and first turbine generator 610 via a speed increaser 660. The hub 224 is attached to a low RPM shaft of a speed increaser 650 and secured via a locking nut 620. The first turbine generator 610 is mounted in electromechanical cooperation with the first turbine shaft 630. As previously described and as shown herein, the first turbine shaft defines an axis of alignment 640 substantially parallel with the path of water flow 215. Also connected to the first turbine shaft 630 is a high RPM side of the speed increaser 650. Optimally, the contents of the first turbine generator housing are maintained in a water tight configuration by a series of barriers and seals, such as seal 660, and positively pressurized by an inert gas.

Importantly, although first turbine generator 610 may be single generator of any practical description, the preferred embodiment of the present invention specifically contemplates first turbine generators 610 being modular in configuration. More specifically, it is contemplated that the first turbine generator housing 410 and first turbine shaft 630 are configured so as to incorporate addition or removal of series generators 610 from any turbine within the dual turbine unit 210. Advantageously, this design allows one dual turbine unit 210 to be purchased for a particular application requiring for instance, a 60 kW capacity. In such a case, a configuration such as four 15 kW generators may be connected in series an utilized to achieve the necessary power rating. If, due to change in characteristics of the body of water or a change of deployment location of the dual turbine unit 210, a 30 kW rating is needed, the first turbine generator housing can be opened and two of the 15 kw series generators can be removed.

Figure 7:
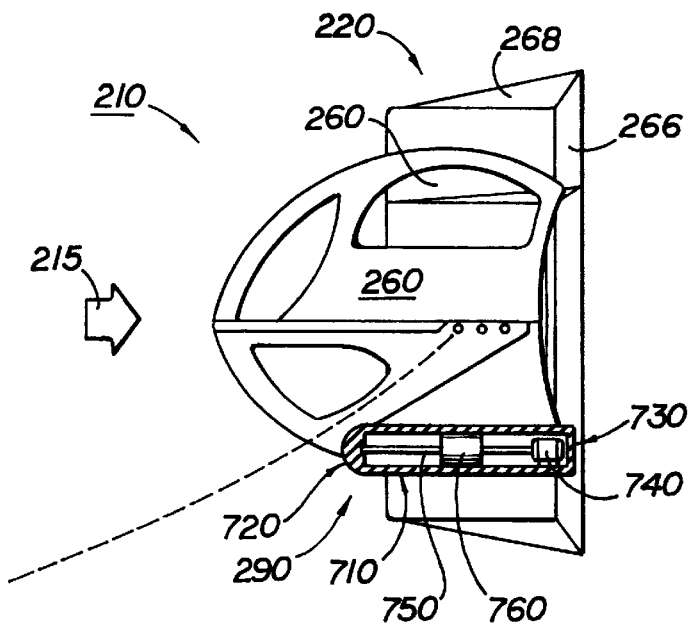
FIG. 7 is a CROSS SECTIONAL view of the exemplary embodiment of the present invention depicted in FIG. 5, taken along section lines B—B.

FIG. 7 is cross-sectional view of the exemplary embodiment of the present invention depicted in FIG. 5, taken along section lines B—B. More particularly, FIG. 7 depicts the relation of the ballasting member 290 to other dual turbine unit 210 components in a preferred embodiment of the present invention. The ballasting member 290 comprises, generally, a ballast tube 710 positioned in generally parallel axial relation to the axis of alignment 640 of the respective first and second turbines 220, 240. Each end of the ballast tube 710 is sealed in a water tight fashion by a respective first endcap 720 and a second end cap 730. The ballast tube 710 sealed on each end by a first or second endcap 720, 730 defines a water tight void. Positioned within the water tight void is fixed DC motor 740. The motor may be driven by electrical current delivered by either the dual turbine unit 210 or preferably an external source. Optimally, control of the motor 740 is maintained externally.

The reversible polarity motor 740 drives a screw or screw-type member 750. The lead screw 750 is positioned in the center of the ballast tube 710 and rotatably secured into the first endcap 720. When the reversible motor 740 is operated in a first polarity, the lead screw is free to rotate in a first direction. When the reversible motor 740 is operated in a reverse polarity, the lead screw 750 rotates in an opposing direction. A ballast 760 is engaged with the lead screw 750 in such a fashion that rotation of the lead screw 750 by the motor 740 moves the ballast fore or aft, depending on the polarity of operation of the reversible motor 740. Although the preferred embodiment of the present invention contemplates the ballast 760 being a weighted member, it is specifically contemplated that the ballast 760 may be an extremely light weight or buoyant member. Although the affect of moving a weighted member to one end of the ballasting member 290 would have one affect and moving a buoyant member to the same end of the ballasting member 290 would have the opposite affect, the desired result of utilization of the ballasting member 290 to change the attitude of the dual turbine unit would be the same, though it would require moving the ballast 760 in an opposite direction.

Figure 8:
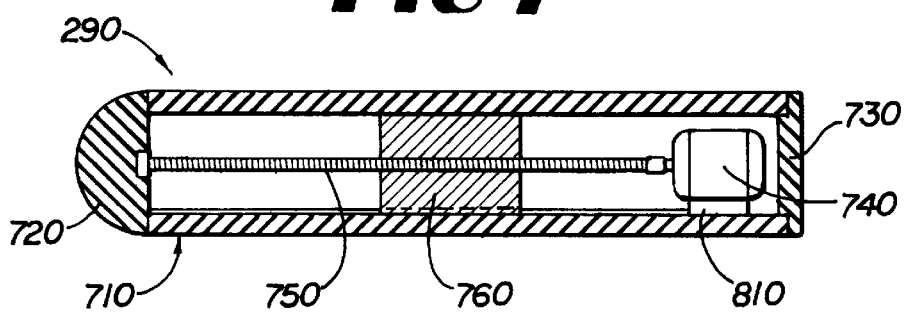
FIG. 8 is a CROSS SECTIONAL view of an exemplary embodiment of the ballasting tube of the present invention.

Referring now to FIG. 8, a close-up view of the ballasting member 290 is depicted. As previously described, ballasting member 290 comprises a ballast tube 710, a first and second endcap 720 and a second endcap 730. The end caps 720 and 730 seal each end of the ballast tube 710 in a water tight configuration and, thereby, define a void within the ballasting member 290. An actuator 740 is positioned within the ballasting member 290 and is affixed in the ballast tube 710 by a motor mount 810. In a preferred embodiment, the actuator 740 is a reversible motor. The reversible motor 740 drives a lead screw 750, which lead screw is attached at a first end to the reversible motor 740 and rotatably attached at its opposing end to the first endcap 720. A ballast 760 is engaged to the lead screw 750 such that rotation of the lead screw 750 by the reversible motor 740 in a first direction moves the ballast 760 toward one end of the ballasting member 290. Rotation of the reversible motor 740 in an opposite direction will move the ballast 760 toward the opposite end of the ballasting member 290.

Finally, the shroud 260 may accommodate a trash rack to block interference of unwanted materials with the turbine blades 226, 246. The trash rack may be configured in any variety of ways, including attachment of removable cables or other rigid or semi-rigid structure between the shroud 260 or the stabilizer fins 268 and a point in front of the turbine blades 226, 246.

The invention is not to be limited by what has been particularly shown and described, except as indicated by the appended claims.

I claim:

1. A dual turbine unit for adjustable deployment in a path of water flow, comprising:
   a. a first turbine having a first turbine runner assembly, the first turbine runner assembly comprising
      a plurality of first turbine blades,
      a first turbine shaft in general axial alignment with the path of water flow,
      a first turbine hub for fixedly mounting the plurality of first turbine blades radially outwardly with respect to the axial alignment of the first turbine shaft, and
      at least one first modular turbine generator, coupled via a speed increaser to the first turbine shaft, for conversion of kinetic energy into electrical energy;
   b. a second turbine having a second turbine runner assembly, the second turbine runner assembly comprising
      a plurality of second turbine blades,
      a second turbine shaft in general axial alignment with the path of water flow,
      a second turbine hub for fixedly mounting the plurality of second turbine blades radially outwardly with respect to the axial alignment of the second turbine shaft, and
      at least one second modular turbine generator, coupled to the second turbine shaft via a speed increaser, for conversion of kinetic energy into electrical energy;
   c. a lightweight dual turbine shroud primarily constructed of at least one material from the group of materials including thermoplastics and fiberglass, the lightweight dual turbine shroud capturing the first turbine and the second turbine, the lightweight dual turbine shroud having a front edge facing the oncoming water flow and a rear edge proximate to a point of water discharge from the dual turbine unit;
   d. an augmnentor ring proximate to and integral with the rear edge of the dual turbine shroud, the augmentor ring extending radially outwardly with respect to the axial alignment of the respective first and second turbine shafts; and
   e. a hollow tubular ballasting member integral to the lightweight dual turbine shroud and disposed in substantially parallel alignment with the axial alignment of the first turbine shaft and the second turbine shaft, the hollow tubular ballasting member having a first end and a second end, the first end being sealed in a watertight fashion by a first end cap, the second end being sealed in a watertight fashion by a second endcap, whereby an inner wall of the hollow tubular ballasting member and the respective first and second endcaps define a watertight void in which a reversible polarity actuator is fixedly attached to the inner wall of the hollow tubular ballasting member, the reversible polarity actuator being functional to rotate a shaft connected to a ballast, whereby rotation of the shaft in a first direction moves the ballast within the void toward the first endcap and whereby rotation of the shaft in a second direction moves the ballast within the void toward the second endcap, which movement of the ballast changes the center of gravity of the dual turbine unit, thereby changing the attitude of the dual turbine unit.

2. The dual turbine unit of claim 1, wherein the dual turbine unit is maintained within the path of water flow by a tether having a first tether end and a second tether end, the first tether end being attached to the dual turbine unit and the second tether end being attached to an anchor.

3. A dual turbine unit for adjustable deployment in a path of water flow, comprising:
   a. a first turbine having a first turbine runner assembly, the first turbine runner assembly comprising
      a plurality of first turbine blades,
      a first turbine shaft in general axial alignment with the path of water flow,
      a first turbine hub for fixedly mounting the plurality of first turbine blades radially outwardly with respect to the axial alignment of the first turbine shaft, and
      a first generator, coupled to the first turbine shaft, for conversion of kinetic energy into electrical energy;
   b. a second turbine having a second turbine runner assembly, the second turbine runner assembly comprising
      a plurality of second turbine blades,
      a second turbine shaft in general axial alignment with the path of water flow,
      a second turbine hub for fixedly mounting the plurality of second turbine blades radially outwardly with respect to the axial alignment of the second turbine shaft, and
      a second generator, coupled to the second turbine shaft, for conversion of kinetic energy into electrical energy;
   c. a dual turbine shroud capturing the first turbine and the second turbine, the dual turbine shroud having a front edge facing the oncoming water flow and a rear edge proximate to a point of water discharge from the dual turbine unit;
   d. an augmentor ring proximate to and integral with the rear edge of the dual turbine shroud, the augmentor ring extending radially outwardly with respect to the axial alignment of the respective first and second turbine shafts; and
   e. a hollow tubular ballasting member integral to the dual turbine shroud and disposed in substantially parallel alignment with the axial alignment of the first turbine shaft and the second turbine shaft, the hollow tubular ballasting member having a first end and a second end, the first end being sealed in a watertight fashion by a first endcap, the second end being sealed in a watertight fashion by a second endcap, whereby an inner wall of the hollow tubular ballasting member and the respective first and second endcaps define a watertight void in which a reversible polarity actuator is fixedly attached to the inner wall of the hollow tubular ballasting member, the reversible polarity actuator being functional to rotate a shaft connected to a ballast, whereby rotation of the shaft in a first direction moves the ballast within the void toward the first endcap and whereby rotation of the shaft in a second direction moves the ballast within the void toward the second endcap, which movement of the ballast changes the center of gravity of the dual turbine unit, thereby changing the attitude of the dual turbine unit.

4. The dual turbine unit of claim 3, wherein the dual turbine unit is maintained within the path of water flow by a tether having a first tether end and a second tether end, the first tether end being attached to the dual turbine unit and the second tether end being attached to an anchor.

5. The dual turbine unit of claim 3, wherein the first generator is a first modular turbine generator and the second generator is a second modular turbine generator.

6. The dual turbine unit of claim 3, wherein the dual turbine shroud is primarily constructed of at least one material from the group of materials including thermoplastics and fiberglass.

7. A multiple turbine unit for adjustable deployment in a path of water flow, comprising:
 a. a plurality of turbines, each turbine having a turbine runner assembly, each turbine runner assembly comprising
  a plurality of turbine blades,
  a turbine shaft in general axial alignment with the path of water flow,
  a turbine hub for fixedly mounting the plurality of turbine blades radially outwardly with respect to the axial alignment of the turbine shaft, and
  a generator, coupled to the turbine shaft, for conversion of kinetic energy into electrical energy;
 b. a turbine shroud primarily constructed of at least one material from the group of materials including thermoplastics and fiberglass, the turbine shroud capturing the plurality of turbines, the turbine shroud having a front edge facing the oncoming water flow and a rear edge proximate to a point of water discharge from the turbine unit;
 c. an augmentor ring proximate to and integral with the rear edge of the turbine shroud, the augmentor ring extending radially outwardly with respect to the axial alignment of the respective turbine shafts; and
 d. an adjustable ballasting member integral to the turbine shroud.

8. The dual turbine unit of claim 7, wherein the dual turbine unit is maintained within the path of water flow by a tether having a first tether end and a second tether end, the first tether end being attached to the dual turbine unit and the second tether end being attached to an anchor.

9. An adjustable ballast assembly for at least one turbine having a turbine shaft, the turbine for deployment in a path of water flow, said adjustable ballast comprising:
 an elongated member in general axial alignment with the turbine shaft; and
 a ballast adapted for movement relative to the elongated member, whereby movement of the ballast changes the center of gravity of the turbine to change the attitude of the turbine in the path of water flow.

10. The adjustable ballast assembly of claim 9 wherein the elongated member is a hollow tube.

11. The adjustable ballast assembly of claim 9 wherein the ballast is a weighted member.

12. The adjustable ballast assembly of claim 9 wherein the ballast is a buoyant member.

13. The adjustable ballast assembly of claim 9 wherein the elongated member defines a watertight void for receiving the ballast therein.

14. The adjustable ballast assembly of claim 13 wherein within the void is a shaft for moving the ballast within the void of the elongated member.

15. The adjustable ballast assembly of claim 14 wherein said shaft rotates to move the ballast within the void of the elongated member.

16. The adjustable ballast assembly of claim 15 wherein an actuator rotates the shaft to move the ballast.

17. The adjustable ballast assembly of claim 16 wherein the actuator is a reversible actuator.

18. The adjustable ballast assembly of claim 9 wherein the ballast is one of a weighted ballast or a buoyant ballast, and the elongated member includes first and second ends, whereby either movement of the weighted ballast toward the first end changes the center of gravity of the turbine to orient the turbine in a first direction or movement of the buoyant ballast toward the first end changes the center of gravity of the turbine to orient the turbine in a second direction.

19. An adjustable ballast assembly for at least one turbine having a turbine shaft, the turbine for deployment in a path of water flow, said adjustable ballast comprising:
 an elongated tube in general axial alignment with the turbine shaft, the elongated tube defining a void therein;
 a ballast adapted for movement in the void; and
 a reversible actuator coupled to a rotatable shaft for moving the ballast in the void, whereby movement of the ballast within the void changes the center of gravity of the turbine to change the attitude of the turbine in the path of water flow.

* * * * *